United States Patent
Ahmed et al.

(10) Patent No.: US 7,277,513 B2
(45) Date of Patent: Oct. 2, 2007

(54) FREQUENCY DOMAIN NOTCHING WITH DUMMY SUBCHANNELS

(75) Inventors: Nadeem Ahmed, Houston, TX (US); Arthur John Redfern, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 707 days.

(21) Appl. No.: 10/651,157

(22) Filed: Aug. 28, 2003

(65) Prior Publication Data

US 2005/0047535 A1   Mar. 3, 2005

(51) Int. Cl.
    *H04B 1/10* (2006.01)
(52) U.S. Cl. ...................... 375/346; 455/501
(58) Field of Classification Search ........ 375/346–350, 375/295, 296, 222, 260; 455/501; 370/286, 370/202, 525–526, 528
See application file for complete search history.

(56) References Cited

U.S. PATENT DOCUMENTS 6,035,000 A * 3/2000 Bingham ............... 375/296
6,332,042 B1 * 12/2001 Kondo et al. ........... 382/239
2003/0193970 A1 * 10/2003 Kim et al. .............. 370/509
2004/0240574 A1 * 12/2004 Piirainen et al. ........ 375/260

OTHER PUBLICATIONS

"Interim Guidelines for Examination of Patent Applications for Patent Subject Matter Eligibility".*

* cited by examiner

*Primary Examiner*—Curtis Odom
(74) *Attorney, Agent, or Firm*—W. James Brady, III; Frederick J. Telecky, Jr.

(57) ABSTRACT

System and method for reducing interference to existing devices. A preferred embodiment comprises specifying a frequency range for a set of dummy signals, specifying a clipping function to ensure that the set of dummy signals do not exceed a maximum power constraint, incorporating a least squares solution for computing the set of dummy signals into the clipping function, and iterating the clipping function until a terminating condition is reached. The use of the clipping function limits the magnitude of the dummy signals, to ensure that dummy signals do not exceed a maximum power constraint.

29 Claims, 5 Drawing Sheets

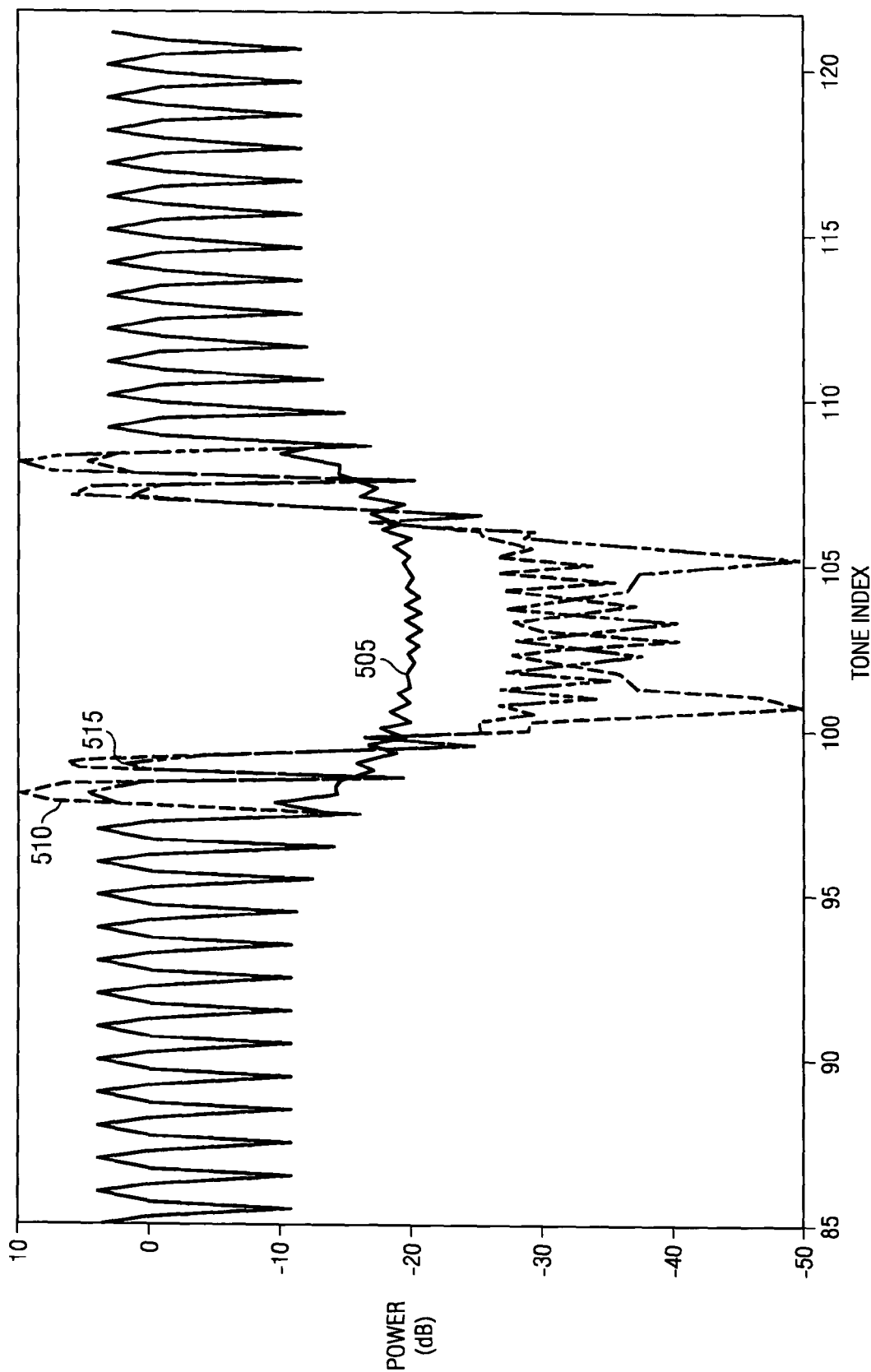

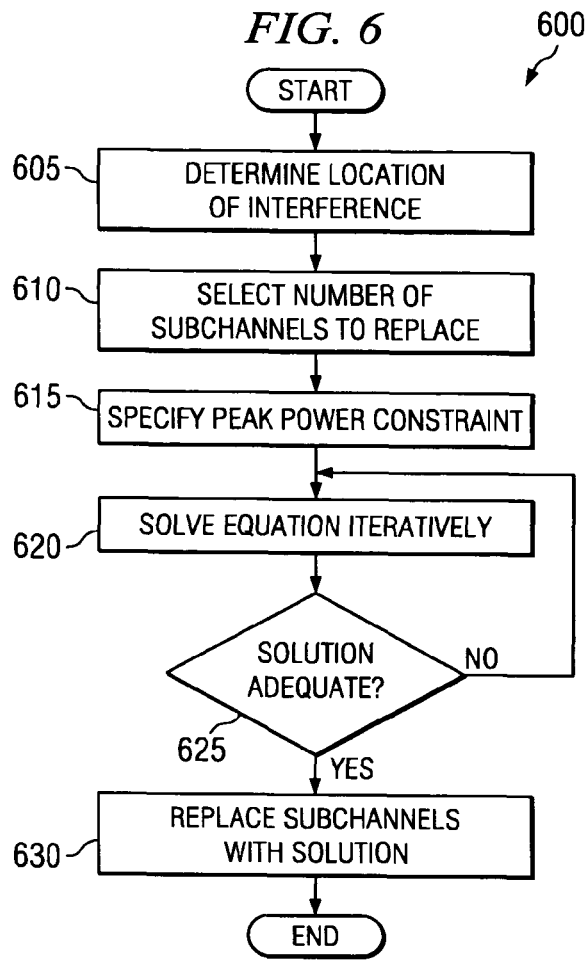
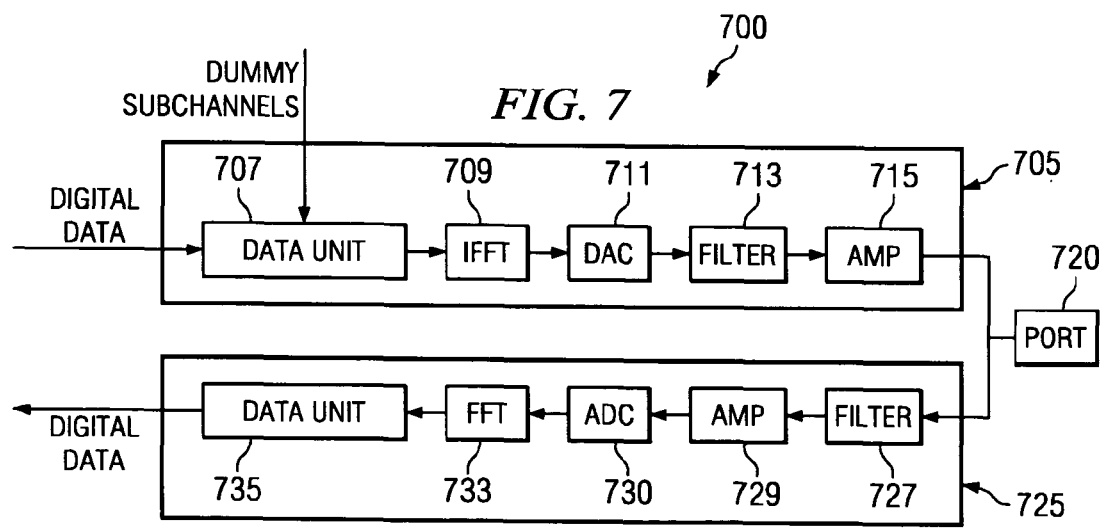

FREQUENCY DOMAIN NOTCHING WITH DUMMY SUBCHANNELS

TECHNICAL FIELD

The present invention relates generally to a system and method for communications systems, and more particularly to a system and method for reducing interference to existing devices through the use of dummy signals to notch out frequency ranges.

BACKGROUND

Interference between electrical systems is a major source of concern for designers of communications systems, even if the communications system being developed happens to use wires. Although interference and interference avoidance are of the utmost importance in wireless communications systems, wired communications systems using electrical signaling and conductive wires can also receive interference from external sources on the conductive wires. Furthermore, wired communications systems can also transmit interference (unintended radiation) on the conductive wires. Therefore electrical systems operating in the close proximity of communications systems (both wired and wireless) may be interfered with to some extent from these communications systems.

In general, when a communications system is developed that interferes with the operation of existing communications systems and electrical systems, it is the responsibility of the communications system being developed to reduce the interference that it generates. As an example, asymmetric digital subscriber lines (ADSL) (and other DSL systems which use discrete multitone (DMT) modulation) is a technology that provides a high-speed communications system using existing telephone lines. ADSL divides the available bandwidth into a plurality of subchannels, assigns data to subchannels, converts the subchannels into a time-domain signal, and then transmits the time-domain signal over the telephone line. Unfortunately, the frequency band used in most ADSL systems encompasses a significant portion of AM radio and amateur radio spectrum and therefore, AM radios and amateur radio systems operating in the vicinity of ADSL transmission lines may receive interference. Since AM radio and amateur radio spectrums are protected, it is up to designers of ADSL systems to prevent their communications systems from interfering with these devices.

A general idea behind several different method for reducing interference from communications systems is to place a limit on the transmit power on portions of the transmission that is causing interference. Essentially, the frequencies that are causing interference are notched out of the transmission. One method for doing this involves the use of notch filters (such as finite impulse response (FIR) or infinite impulse response (IIR) filters). A second method, which is well suited for use in ADSL systems, simply turns off subchannels which correspond to the interfering frequencies.

More advanced methods that exploit properties of the ADSL signal can reduce the number of subchannels that need to be turned off. By reducing the number of subchannels, the impact of the interference reduction techniques on the data rate of the communications system can be reduced. One method, referred to as transmitter windowing, applies a window to the transmitted signal. A second method uses subchannels (referred to as dummy subchannels) on either side of the subchannels corresponding to the interfering frequencies to transmit dummy signals (as opposed to data) to improve the notch. When properly designed, transmitter windowing and/or dummy subchannels can reduce the percentage of the transmission bandwidth that is dedicated to interference reduction.

One disadvantage of the prior art is that the use of zeroes in the frequency ranges that are causing the interference can consume a significant percentage of the overall transmission bandwidth. This can reduce the data rate of the communications system.

A second disadvantage of the prior art is that the use of filters and transmitter windowing to eliminate the frequency ranges that are causing interference can make it difficult for the receiver of the signal to equalize the received signal.

A third disadvantage of the prior art is that the use of calculated values (dummy signals) to reduce the number of subchannels which need to be turned off around the frequency ranges that are causing interference may result in portions of the transmission exceeding a specified power spectral density mask. This can make the communications system non-compliant to technical and regulatory specifications and possibly prevent its sale and use.

SUMMARY OF THE INVENTION

These and other problems are generally solved or circumvented, and technical advantages are generally achieved, by preferred embodiments of the present invention which provides a system and method for reducing interference to existing devices through the use of dummy signals to notch out frequency ranges.

In accordance with a preferred embodiment of the present invention, a method for computing dummy signals comprising specifying a frequency range to hold the dummy signals, setting a clipping function, incorporating a least squares solution for the dummy signals into the clipping function, and iterating the clipping function with the incorporated least squares solution until a terminating condition is reached.

In accordance with another preferred embodiment of the present invention, a method for reducing interference comprising determining a first frequency range of interference, specifying a second frequency range to hold dummy signals, computing the dummy signals, wherein the computing comprises setting a clipping function, incorporating a least squares solution for the dummy signals into the clipping function, iterating the clipping function with the incorporated least squares solution until a terminating condition is reached, the method further comprising inserting the dummy signals and data into a transmission unit, and transmitting the transmission unit.

In accordance with another preferred embodiment of the present invention, a transmitter comprising a data unit coupled to a data source, the data unit containing circuitry to insert data and dummy signals into subchannels into a transmission unit, a compute unit coupled to the data unit, the compute unit to compute the dummy signals based upon a least squares constraint in conjunction with a clipping constraint, a digital-to-analog converter (DAC) coupled to the data unit, the DAC to convert the transmission unit into an analog transmission unit, and a data port coupled to the DAC, the data port to inject the analog transmission unit onto a communications channel.

In accordance with another preferred embodiment of the present invention, an electronic device comprising a data port for transmitting and receiving data, a receiver coupled to the data port, the receiver containing circuitry to convert data received from the data port into digital data, a transmitter coupled to the data port, the transmitter comprising a data unit coupled to a data source, the data unit containing circuitry to insert data and dummy signals into subchannels into a transmission unit, a compute unit coupled to the data unit, the compute unit to compute the dummy signals based upon a least squares constraint in conjunction with a clipping constraint, and a digital-to-analog converter (DAC) coupled to the data unit, the DAC to convert the transmission unit into an analog transmission unit and to provide the analog transmission unit to the data port to be transmitted.

An advantage of a preferred embodiment of the present invention is that the use of dummy subchannels with calculated values (dummy signals) can help reduce the total number of subchannels that are not carrying actual data and minimize the impact on the communication system's data rate.

A further advantage of a preferred embodiment of the present invention is that the calculated values can be set to not exceed a specified maximum. Therefore, any specified power spectral density (PSD) mask can be met and technical and regulatory specifications can be met.

Yet another advantage of a preferred embodiment of the present invention is that a significant portion of the calculations used can be calculated before they are needed and saved to memory. Therefore, there is not a significant computational requirement in order to support the present invention.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIG. 5 is a data plot illustrating signal power versus subchannels for transmissions for several interference reduction techniques, according to a preferred embodiment of the present invention;

FIG. 6 is a flow diagram of a process that can be used to calculate and place dummy signals into subchannels, according to a preferred embodiment of the present invention; and FIG. 7 is a diagram of a high-level view of a portion of a transceiver, according to a preferred embodiment of the present invention.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a digital subscriber line (DSL) (specifically an asymmetric digital subscriber line (ADSL)) communications system that is operating near electrical devices that can be sensitive to its unintended radiation. The invention may also be applied, however, to other wireless and wired communications systems wherein transmissions and unintended radiation from the communications systems can cause interference with nearby electrical devices.

Figure 1:
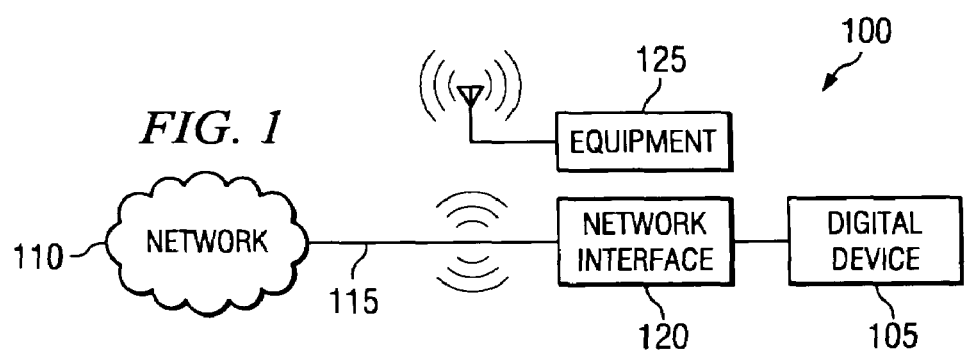
FIG. 1 is a diagram of an exemplary operating environment for a digital device.

With reference now to FIG. 1, there is shown a diagram illustrating an exemplary operating environment 100 for a digital device 105. The digital device 105 is displayed in FIG. 1 as being connected to a network 110 (such as the Internet or any other type of information network) via a network connection 115. Note that while displayed as a wired connection, the network connection 115 between the network 110 and the digital device 105 may also be of the wireless variety. A network interface 120 serves as an intermediary between the network 110 and the digital device 105, performing any necessary protocol and signal compatibility transformations to facilitate communications between the digital device 105 and devices (not shown) in the network 110.

Although displayed as a wired connection, meaning that transmissions between the network 110 and the digital device 105 are carried within a wire, the network connection 115 may unintentionally radiate signals that may be received by electrical equipment and other devices (displayed as equipment 125) operating in the vicinity. Examples of the equipment 125 may include but are not limited to radios (one-way and two-way), communications equipment, other communications systems, and so forth. If the unintended radiation should happen to fall within the operating frequency of the equipment 125, then it could appear as interference to the equipment 125. Note that the equipment 125 may receive (pick up) the unintended radiation via an antenna or by unshielded wiring.

Figure 2A:
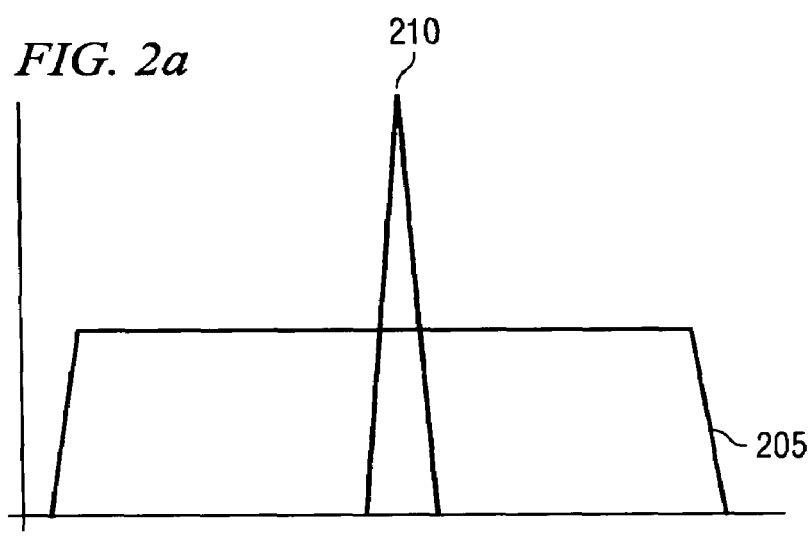
FIGS. 2a and 2b are diagrams of frequency domain views of a transmission causing interference for signals in electrical equipment operating nearby.
Figure 2B:
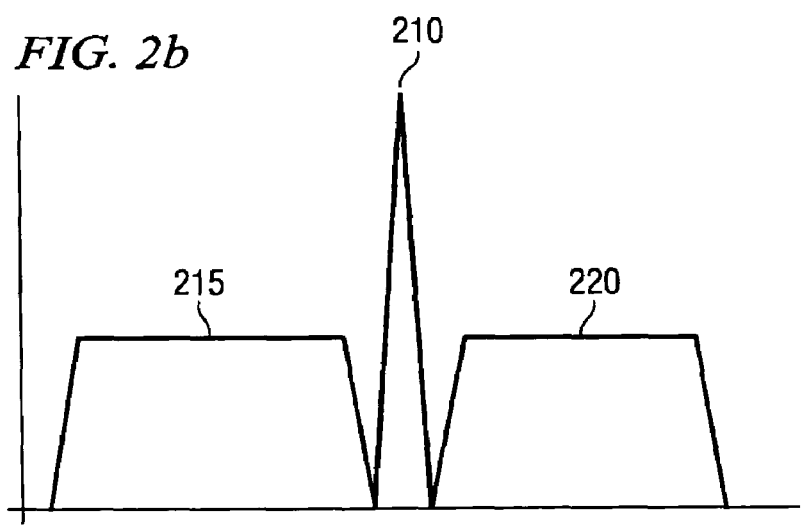

With reference now to FIGS. 2a and 2b, there are shown diagrams illustrating frequency domain views of a transmission 205 from a communications system and a signal 210 from electrical equipment operating in close proximity and a technique usable by the communications system to help reduce interference upon the signal 210 from its transmissions. Note that interference caused by the transmission 205 being directly transmitted into the air (if the communications system is a wireless system) or by unintended radiation (if the communications system is a wired system using wires that are not completely shielded). While being displayed as being significantly larger than the transmission 205, the signal 210 may still be interfered with by the transmission 205. Even when the magnitude of the transmission is significantly smaller than that of the signal 210, a negative impact upon the quality of the signal may still be observed.

With reference now to FIG. 2b, the communications system may be able to avoid causing interference to the signal 210 by splitting its transmission into two parts 215 and 220, wherein there is no data being transmitted within a frequency band occupied by the signal 210. Note that if there are additional signals (not shown), the communications system may split its transmission into further parts. By splitting its transmission into parts 215 and 220, none of the data being transmitted is interfering with the signal 210, therefore while the overall data rate of the communications system may be reduced by an amount that is dependent upon the size of the frequency band occupied by the signal 210, the communications system has reduced its interference to the signal 210 and the electrical equipment.

Figure 3A:
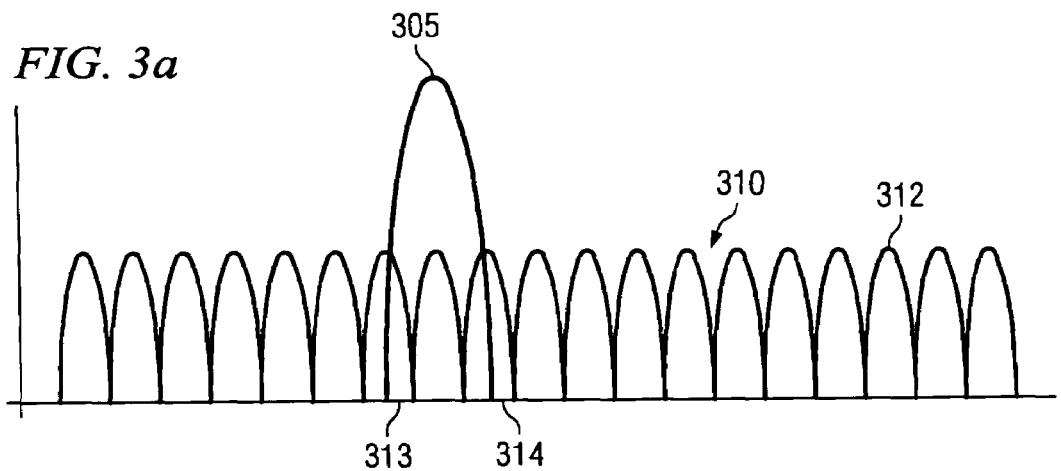
FIGS. 3a through 3d are diagrams of frequency domain views of several prior art techniques for eliminating portions of a transmission to reduce interference to signals in electrical equipment operating near a communications system.

With reference now to FIGS. 3a through 3d, there are shown diagrams illustrating frequency domain views of a signal 305 (perhaps from electrical equipment, such as radios and other communications systems operating nearby) and a plurality of subchannels 310 (from a transmission from a communications system) and several prior art techniques for eliminating data transmission within a frequency band covered by the signal 305. Note that FIGS. 3a through 3d are idealized frequency domain views that have been simplified for ease of illustration and discussion. FIG. 3a displays the signal 305 located at a frequency that places it in the middle of a plurality of subchannels 310. The plurality of subchannels 310 can be made up of individual subchannels (for example, subchannel 312) that are each located at different frequencies within a frequency band covered by the transmission from the communications system. The plurality of subchannels 310 as displayed in FIG. 3a may represent a transmission from an asymmetric digital subscriber line (ADSL) based communications system. Furthermore, the plurality of subchannels 310 may also represent the unintended radiation from the transmission line (for example, the ADSL signal itself). As displayed in FIG. 3a, some of the subchannels (such as subchannel 313 and 314) interferers with the signal 305.

When it is determined that transmissions from the communications system interferers with electrical devices operating in the general vicinity, it can be possible to determine the frequency band(s) that these electrical devices operate in and adjust the transmissions of the communications system so that the interference can be reduced or eliminated. A commonly used way to reduce the interference to the electrical devices is to notch out portions of the frequency band of the transmissions so that there are no data in the portions of the frequency band being notched out. Since there is no data in the notched out frequency bands, there can be no interference to the electrical devices.

Figure 3B:
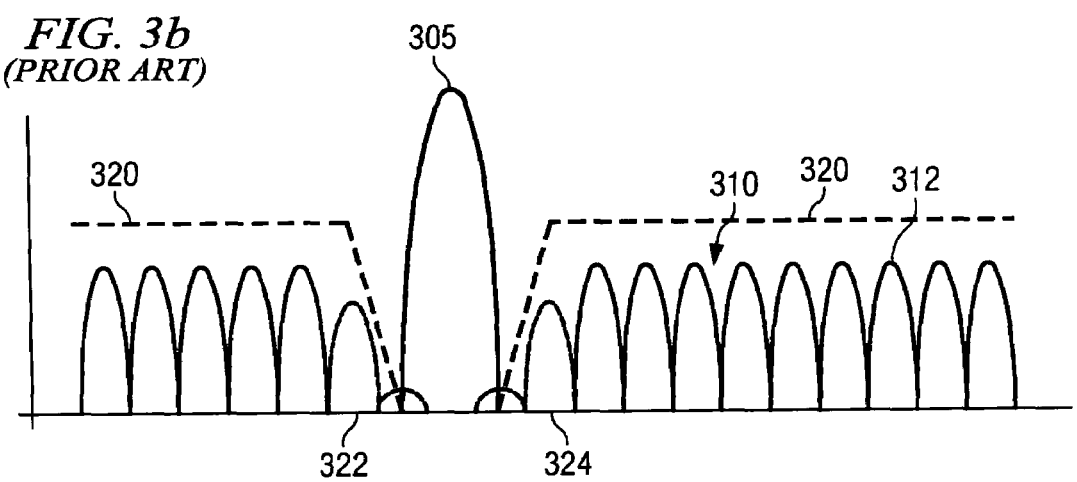

With reference now to FIG. 3b, there is shown a diagram illustrating a prior art technique of using filters to eliminate portions of the plurality of subchannels 310 that is creating interference with the signal 305. One way to notch out portions of the frequency band is through the use of filters. Notch filters (which may be implemented as infinite impulse response (IIR) or finite impulse response (FIR) filters) can be used to block specified frequency ranges from the transmission. As displayed in FIG. 3b, a frequency response plot 320 of a notch filter may be used to attenuate and eliminate portions of the plurality of subchannels 320. Note that subchannels in the transition between the notch filter's pass band and stop band (such as subchannels 322 and 324) may be attenuated, but not completely eliminated. However, to be truly effective at reducing interference, the subchannels that are interfering with the electrical equipment should be in the stop band of the notch filter. Therefore, the attenuated subchannels (subchannels 322 and 324, for example) can be used to carry data, but at a reduced capacity. This may lead to a significant impact on the available data rate of the communications system because subchannels that are not directly impacting the electrical equipment may not be able to carry their maximum amount of data.

Figure 3C:
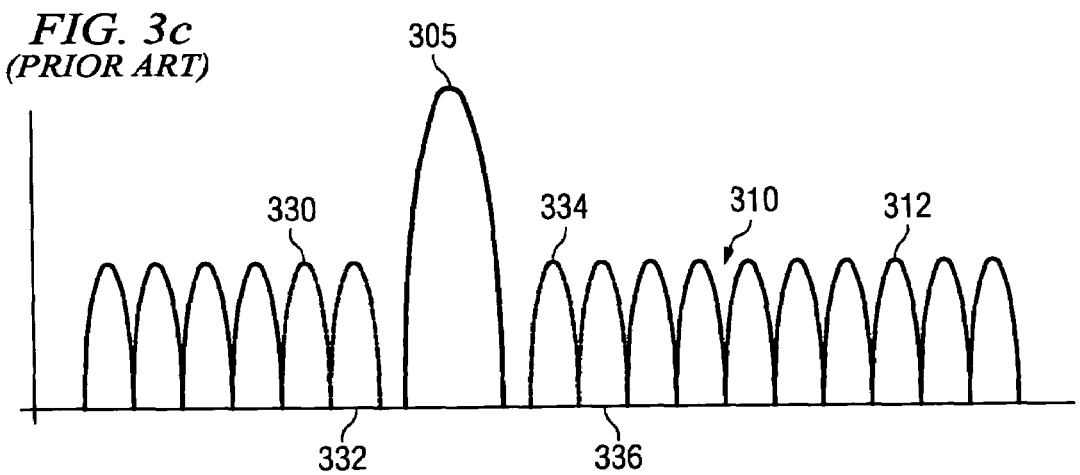

With reference now to FIG. 3c, there is shown a diagram illustrating a prior art technique of placing zeroes in subchannels to eliminate portions of the plurality of subchannels 310 that is creating interference with the signal 305. Another way to notch out portions of the frequency band is to simply zero-out the subchannels that are interfering with the electrical devices. Unfortunately, the magnitudes of the signals in the adjacent subchannels decay rather slowly, with the rate of decay being expressible as:

$$\frac{\sin(2\pi k)}{2\pi k},$$

where $$k = \left(n - \frac{f}{\Delta f}\right)\left(1 + \frac{P}{N}\right),$$

P is the length of the cyclic prefix, $\Delta f$ is the subchannel spacing, and N is the total number of subchannels. This is commonly referred to as a sync function. Therefore, rather than simply zeroing out the subchannels directly affecting the electrical devices, adjacent subchannels (such as subchannels 330, 332, 334, and 336) may also need to be zeroed out. Note that the number of adjacent subchannels that need to be zeroed out may depend upon factors such as P, $\Delta f$ and N. Again, this can have a detrimental effect on the data rate of the communications system.

Figure 3D:
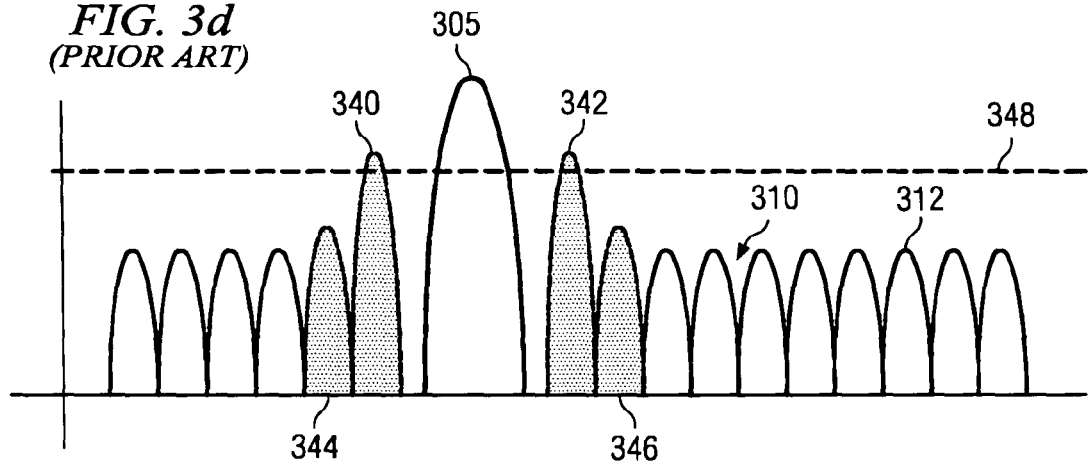

With reference now to FIG. 3d, there is shown a diagram illustrating a prior art technique of placing specially calculated signals in subchannels to eliminate portions of the plurality of subchannels 310 that is creating interference with the signal 305. The prior art technique illustrated in FIG. 3d makes use of the fact that the magnitudes of the signals outside of the subchannels (commonly referred to as sidelobes) decay slowly and exist outside of the frequency range for each subchannel. By specially selecting dummy signals that are to be placed in subchannels that interferer with the signal 305 and certain subchannels adjacent to the signal 305 (which can be determined based on the number of subchannels that interferer and the sharpness of the notching and so forth), cancellation of the portions of the signals not in their respective subchannels can be used to reduce the total number of subchannels that are not carrying data. With signal cancellation, the number of subchannels required for a given notch in the frequency band can be smaller than when simply zeroes are placed in the subchannels. This can reduce the impact on the data rate of the communications system.

One commonly used technique to compute the dummy signals that need to be placed in the subchannels uses the least squares technique. The least squares technique is considered to be well understood by those of ordinary skill in the art of the present invention and will not be discussed herein in detail. The following outlines one way to compute such dummy signals for a communications system using discrete multitone (DMT), a modulation technique used in ADSL communications systems, and the use of the least squares technique.

The signal transmitted during a DMT frame, y(f), may be written as:

$$y(f) = \sum_{i \in X} a_i(f) x_i + \sum_{j \in S} a_j(f) s_j \quad (1)$$

where X is the set of dummy subchannels, S is the set of data subchannels, $x_i$ is the signal on the i-th dummy subchannel, and $s_j$ is the signal on the j-th data subchannel.

Ideally, it would be desirable to suppress the sidelobe levels at all frequencies within the frequency band to keep them below a maximum level:

$$\|y(f)\|^2 \leq \alpha_y, \forall f \in R \quad (2)$$

where R is the set of frequencies in the frequency band. However, to simplify the optimization, the least squares approach minimizes the energy in the band, $$\min_{x_i} \|y(f)\|^2 \leq \alpha_y \, \forall \, f \in R \quad (3)$$

by choosing the signal on the dummy subchannels appropriately.

If f is sampled at an appropriate rate, then the characteristics of the signal is captured and a vector notation for the transmitted signal can be obtained:

$$y = \begin{bmatrix} y(f_0) \\ \vdots \\ y(f_{F-1}) \end{bmatrix} \quad (4)$$

$$= \begin{bmatrix} a_0(f_0) & \cdots & a_{U-1}(f_0) \\ \vdots & & \vdots \\ a_0(f_{F-1}) & \cdots & a_{U-1}(f_{F-1}) \end{bmatrix} \begin{bmatrix} x_0 \\ \vdots \\ x_{U-1} \end{bmatrix} +$$

$$\begin{bmatrix} a_0(f_0) & \cdots & a_{U-1}(f_0) \\ \vdots & & \vdots \\ a_0(f_{F-1}) & \cdots & a_{U-1}(f_{F-1}) \end{bmatrix} \begin{bmatrix} s_0 \\ \vdots \\ s_{L-1} \end{bmatrix}$$

$$= Ax - b.$$

Choosing x to minimize the power of the transmitted signal in equation (4) results in the well know least squares problem:

$$A^H A x = A^H b \quad (5)$$

with solution:

$$x = (A^H A)^{-1} A^H b \quad (6)$$

where x is the signal to put in the dummy subchannels.

Note, however, that the determination of the signal to be placed in the subchannels can result in signals adjacent to the frequency band that is being notched out to have very high signal power. If the signal power is very high, the PSD peak power constraint may be violated. FIG. 3d illustrates several subchannels adjacent to the signal 305 (such as subchannels 340, 342, 344, and 346) containing dummy signals. Unfortunately, the magnitudes of the dummy signals in subchannels 340 and 342 exceed a PSD peak power constraint (illustrated as a dotted line 348). By exceeding the PSD peak power constraint the communications system may be in violation of technical and/or regulatory specifications.

In an ADSL communications system, there are typically two PSD constraints, a first constraint specifies an average power for each subchannel and a second constraint places a limit on the maximum power permitted on each subchannel. The difference between the average power constraint and the maximum power constraint is the amount above nominal power that the power on the dummy subchannels is allowed to have. Thus, it can be crucial to find a solution (the signals to be placed in the dummy subchannels) that does not overshoot the nominal power by more than some fixed amount (less than the difference between the average and maximum permitted powers).

Figure 4:
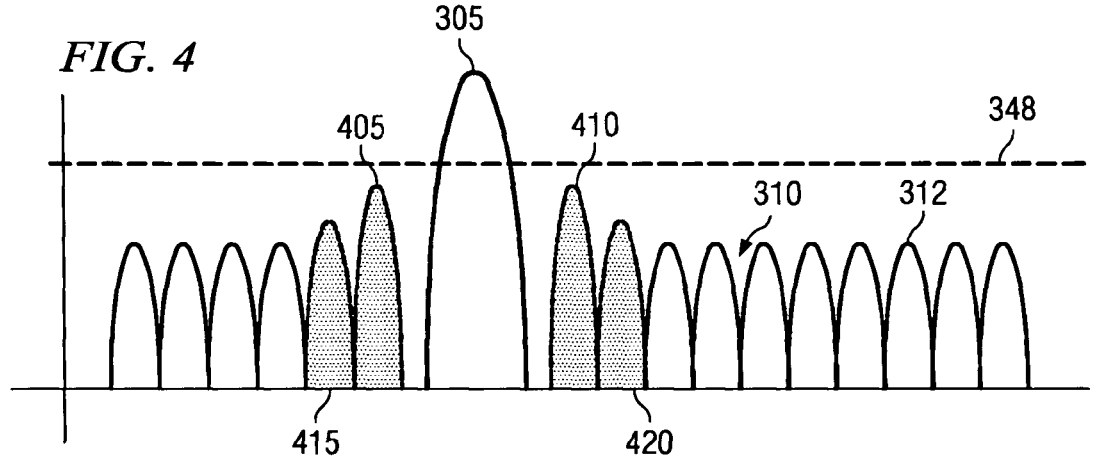
FIG. 4 is a diagram of a frequency domain view of a technique using dummy signals in dummy subchannels to reduce interference to signals in electrical equipment operating near a communications system, according to a preferred embodiment of the present invention.

With reference now to FIG. 4, there is shown a diagram illustrating a frequency domain view of a signal 305 and a plurality of subchannels 310 and several dummy subchannels containing signals for use in eliminating data transmissions within a frequency band covered by the signal, wherein the signals in the dummy subchannels are determined using a technique that ensures that the magnitudes of the signals do not exceed a specified maximum power constraint 348, according to a preferred embodiment of the present invention. As discussed above, the application of the least squares technique to the problem of calculating dummy signals to be placed into dummy subchannels can reduce the number of dummy subchannels required to notch out a frequency band from a transmission, wherein the frequency band is causing interference to electrical equipment (such as radios and other communications systems) operating in the general vicinity. While the use of the least squares technique is effective in calculating the dummy signals, a problem with the dummy signals is that some of the dummy signals may exceed power spectral density requirements (such as maximum power) permitted for the transmission.

According to a preferred embodiment of the present invention, a constraint can be applied to the least squares technique to ensure that none of the dummy signals calculated will exceed the constraint. The constraint may be applied to the least squares technique through a mathematical theorem known as the contraction mapping theorem. The contraction mapping theorem is considered well understood by those of ordinary skill in the art of the present invention. The constraint (in this case, a peak or maximum power constraint) for the dummy signal in the dummy subchannels can be expressed as:

$$x = c_{\alpha_x}(x) \quad (7)$$

where c is a clipping function that can be used to constrain x to $\pm \alpha_x$. The least squares solution for x (equations (5) and (6)) may be incorporated into equation (7) by adding zero to the clipping function in equation (7):

$$x = c_{\alpha_x}(x + m(A^H A x - A^H b)) \quad (8)$$

$$= T(x)$$

where m is a constant. A solution which can satisfy both the clipping and least squares constraints can be found by iterating equation (8):

$$x_{i+1} = T(x_i). \quad (9)$$

According to a preferred embodiment of the present invention, an initial value for x, referred to as $x_0$, may be specified and then equation (9) may be iterated until a solution that satisfies both the clipping and the least squares constraints is found. Examples of good selections for $x_0$ can be all zeroes or a solution for x using the least squares solution only (i.e., equation (6)). A solution for x, which satisfies both constraints, may typically be found within a few iterations. However, a larger number iterations may be able to produce solutions (dummy signals) which have deeper notches, which can further minimize the interference effects of the transmissions upon electronic equipment.

Note that the computation of $A^H A$ can be precomputed and stored, and $A^H b$ needs to be only computed once per iteration. Therefore, for each iteration of equation (9), the number of required computations is on the order of a matrix/vector multiplication. Therefore, with certain values precalculated and stored, the application of equation (9) can be practical for real-time implementations. Upon power-up (or reset) of a communications system, it may be typical for the communications system to undergo training. Training may be used for the transmitter and receiver to obtain an image of the communications channel, adjust transmit and receive circuitry, to adjust various filters, and so forth. During training, the transmitter may also perform the precomputation of $A^H A$ and then store it in a memory. The precomputed value of $A^H A$ may then be retrieved for use during the computation of the dummy signals, which occurs once per transmission block.

With reference now to FIG. 5, there is shown a data plot illustrating a signal power versus tone index (subchannel) for a transmission with several subchannels adjacent to a notched frequency band containing dummy signals, wherein different techniques are used to arrive at the dummy signals, according to a preferred embodiment of the present invention. A first curve (curve 505) illustrates the results of the technique of placing zeroes into the dummy subchannels adjacent to the notched frequency band. Note that inside the notched frequency band, the signal power has a minimum of approximately −20 dB. A second curve (curve 510) illustrates the results of the technique of using the least squares constraint to compute the dummy signals. With the second curve, the signal has a minimum of approximately −35 dB (ignoring the two large valleys) within the notched frequency band. Note however that the second curve 510 also shows that the peak signal strength in the dummy subchannels is significantly higher than the peak signal strength in the data subchannels (approximately 7 dB). It is possible that these signals exceed the maximum power level constraints.

A third curve (curve 515) illustrates the results of the technique of using both the clipping and the least squares constraints to compute the dummy signals. With the third curve, the signal has a minimum of approximately −30 dB within the notched frequency band. Note that while the third curve shows a high signal strength within the notched frequency band, it also shows that the dummy signals have a maximum signal strength that is approximately one to two dB higher than the data subchannels. It is unlikely that a one or two dB difference in signal strength would result in any of the dummy signals exceeding the maximum power level constraints.

With reference now to FIG. 6, there is shown a flow diagram illustrating a process 600 that can be used to calculate and place dummy signals in subchannels using both the clipping and least squares constraints, according to a preferred embodiment of the present invention. According to a preferred embodiment of the present invention, the process 600 may be executed by a transmitter after system initiation or reset. The process 600 may execute during a training period wherein the transmitter is initializing circuitry and filters and so forth. Alternatively, the process 600 may be executed after the transmitter receives information that a portion of its transmission is causing interference with electronic equipment operating nearby. The information may be provided to the transmitter in the form of a message containing frequency ranges where interference is occurring.

The computation of the dummy signal begins by first determining information crucial to the generation of the dummy signals (block 605). The information can include: the frequency range(s) that is to be notched out, specifics about desired characteristics of the notch (including how quickly to transition between data in the transmission and the notched subchannels, and peak power constraints). As an example, the transmitter may have stored in its memory, a list of frequency bands that it needs to notch out and the peak power constraints. Based on the characteristics of the frequency band(s), such as size, location, and proximity, the transmitter can then determine the number of subchannels that should dedicate to carrying the dummy signals (block 610). For example, if there are two frequency bands that are close to one another, the transmitter may decide to place dummy signals in the subchannels between the frequency bands to help improve the characteristics of the notch rather than attempting to use the subchannels to carry data.

After specifying the set of subchannels to carry the dummy signals and the maximum signal power level, the transmitter can precompute $A^H A$ (block 615) and save it to memory for later use. With $A^H A$ precomputed and stored, the transmitter can wait until there is data to transmit (block 620). When there is data to transmit, the transmitter can take one transmission block's worth of data (an amount that can vary between systems) and use it to compute $A^H b$ (block 625). After computing $A^H b$, the transmitter can begin the iterative process of computing the dummy signals. Using equations (8) and (9) the transmitter can compute a set of dummy signals (block 630). The transmitter may need to specify an initial value for the dummy signals. Examples of good initial values may be all zeroes or a set of dummy signals computed by using only the least squares constraint. After an iteration of solving for the dummy signals, the transmitter may check to see if the solutions are adequate (block 635). For example, the transmitter may transmit some data to a receiver and have it check to see if any of part of the transmission exceeds the maximum signal power level constraint. The transmitter may also check to see if the signal in the notched frequency band is sufficiently small. Alternatively, the transmitter may simply have a fixed number of iterations that it wishes to use in the computation of the dummy signals. In this case, block 635 can check to see if the required number of iterations has been met. After determining that the solution is adequate (block 635), the transmitter can insert the dummy signals into the dummy subchannels of the transmission block (block 640). The transmission block is then ready to be prepared for transmission. The process illustrated in blocks 620 through 640 can be repeated for each transmission block.

With reference now to FIG. 7, there is shown a diagram illustrating a high-level view of a portion of a transceiver 700, wherein the transceiver 700 has a transmitter 705 that can insert dummy signals into subchannels, according to a preferred embodiment of the present invention. Note that FIG. 7 displays a portion of the transceiver 700 that can be used to transmit data and to receive data and that the transceiver 700 may have other circuitry that may have not be illustrated. The transceiver 700 has a transmitter 705 that may be used to convert data from a digital format into a format suitable for transmission by a data port 720. Note that while displayed as having a data port 720, the transmitter 700 can transmit and receive data using other devices, such as an antenna.

The transmitter 705 may have as input a stream of digital data that it is to transmit. The stream of digital data can be provided to a data unit 707, where the digital data can be placed into subchannels. The data unit 707 may also have another input that can be coupled to a compute unit 708. The compute unit 708 can provide information regarding dummy subchannels and dummy signals to be placed in the dummy subchannels. As discussed previously, the dummy subchannels and certain other information can be computed during a training period and stored for later use. Then, as the transmitter 705 has data to transmit (usually in the form of a transmission block), the dummy signals can be computed by a computation unit (not shown) and inserted into the transmission block. Output of the data unit 707 can then be converted into a time domain signal by an inverse Fourier transform unit 709. According to a preferred embodiment of the present invention, the inverse Fourier transform unit 709 can implement a class of inverse Fourier transform algorithms commonly referred to as Inverse Fast Fourier Transforms (IFFT).

The time domain signal can then be converted into an analog signal by a digital-to-analog converter (DAC) 711. Filtering can be applied to the analog signal by a filter 713 to help ensure that the data to be transmitted meets spectral restrictions. Finally, an amplifier 715 can be used to bring signal levels to levels compatible with transmission. The data port 720 can be used to inject the data into the communications channel (not shown).

The transceiver 700 can also have a receiver 725, which essentially reverses the operations of the transmitter. The receiver 725 may have a filter 727 which can be used to block out out-of-band signals from the received signal, an amplifier 729 which can be used to amplify the received signal and bring it to a level that is compatible with other circuitry in the receiver 725, an analog-to-digital converter (ADC) 731 which converts the received signal into a digital representation, a Fourier transform unit 733 which converts the digital time domain signal back into a frequency domain signal, and a data unit 735 which can be used to extract digital data from the subchannels of the frequency domain signal. Output of the receiver 725, digital data, can be provided to circuitry for additional processing or to digital devices coupled to the transceiver 700 that actually use the information carried in the digital data.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for computing dummy signals to reduce interference in a communications system comprising:
specifying a frequency range within the communications system to hold the dummy signals;
setting a clipping function;
incorporating a least squares solution for the dummy signals into the clipping function; and
iterating the clipping function with the incorporated least squares solution until a terminating condition is reached, wherein interference in the communications system is reduced.

2. The method of claim 1, wherein the clipping function is $c_{\alpha_x}(x)$, wherein x represents the dummy signals, and wherein the clipping function constrains x to $\pm\alpha_x$.

3. The method of claim 2, wherein the clipping function specifies a maximum value for the dummy signals.

4. The method of claim 2, wherein the clipping function specifies a maximum and a minimum value for the dummy signals.

5. The method of claim 1, wherein the incorporating comprises adding a zero to the clipping function, and wherein the clipping function can then be expressed as: $x^{i+1}=c_{\alpha_x}(x_i+m(A^H Ax_i - A^H b))$, where $x_i$ and $x_{i+1}$ represent iterations of the dummy signals, $c_{\alpha_x}(x)$ is the clipping function, m is a scalar constant, A is expressible as:

$$\begin{bmatrix} a_0(f_0) & \cdots & a_{U-1}(f_0) \\ \vdots & & \vdots \\ a_0(f_{F-1}) & \cdots & a_{U-1}(f_{F-1}) \end{bmatrix},$$

$A^H$ is a Hermetian transpose of A, b is expressible as $$\begin{bmatrix} a_0(f_0) & \cdots & a_{U-1}(f_0) \\ \vdots & & \vdots \\ a_0(f_{F-1}) & \cdots & a_{U-1}(f_{F-1}) \end{bmatrix} \begin{bmatrix} s_0 \\ \vdots \\ s_{L-1} \end{bmatrix},$$

$a_k(f_l)$ is the magnitude of the k-th sidelobe of frequency range l, $a_0$ is the magnitude of the 0-th sidelobe of frequency range l, $s_n$ is a signal on frequency range n, and $s_0$ is the 0-th signal on frequency range n.

6. The method of claim 1, wherein the terminating condition is a specified number of iterations.

7. The method of claim 1, wherein the terminating condition is that the signal in a band to be notched is sufficiently small.

8. A method for reducing interference comprising:
determining a first frequency range of interference;
specifying a second frequency range to hold dummy signals;
computing the dummy signals, wherein the computing comprises
setting a clipping function;
incorporating a least squares solution for the dummy signals into the clipping function;

iterating the clipping function with the incorporated least squares solution until a terminating condition is reached;

the method further comprising inserting the dummy signals and data into a transmission unit; and transmitting the transmission unit.

9. The method of claim 8, wherein the determining comprises:

receiving interference information; and parsing the interference information to determine the first frequency range of interference.

10. The method of claim 9, wherein the interference information is provided in the form of a list.

11. The method of claim 8, wherein the second frequency range encompasses the first frequency range and a predetermined amount of bandwidth.

12. The method of claim 11, wherein the predetermined amount of bandwidth is used to carry the dummy signals.

13. The method of claim 12, wherein a portion of the predetermined amount of bandwidth is located at a start and a stop end of the second frequency range, and wherein the dummy signals are placed at both the start and the stop end.

14. The method of claim 8, wherein the second frequency range spans a portion of the transmission unit, and the method further comprising after the inserting, placing data into portions of the transmission unit outside of the second frequency range.

15. The method of claim 8, wherein the transmitting occurs over a wired communications channel.

16. The method of claim 15, wherein the wired communications channel is a digital subscriber line (DSL).

17. The method of claim 8, wherein the transmitting occurs over a wireless communications channel.

18. The method of claim 8, wherein the determining and specifying are performed once, and wherein the computing, inserting, and transmitting are performed for each transmission unit.

19. The method of claim 18, wherein the dummy signals are stored in a memory after the computing, and wherein the dummy signals are read from the memory prior to the inserting.

20. A transmitter comprising:

a data unit coupled to a data source, the data unit containing circuitry to insert data and dummy signals into subchannels as a part of a transmission unit;

a compute unit coupled to the data unit, the compute unit to compute the dummy signals, wherein a least squares optimization is used to iteratively compute the dummy signals, and wherein a constraint is directly imposed on a power of the dummy signals during each iteration using a clipping function;

a digital-to-analog converter (DAC) coupled to the data unit, the DAC to convert the transmission unit into an analog transmission unit; and a data port coupled to the DAC, the data port to inject the analog transmission unit onto a communications channel.

21. The transmitter of claim 20, wherein a portion of the computations performed by the compute unit can be performed during a training period and saved to a memory for later use.

22. The transmitter of claim 21, wherein there are a plurality of transmission units, and wherein the compute unit computes the dummy signals for each transmission unit.

23. The transmitter of claim 20, wherein the transmitter is used in a digital subscriber line communications system, and the transmitter further comprising an inverse Fourier transform unit coupled to the data unit, the inverse Fourier transform unit to convert the transmission unit into a time domain representation.

24. The transmitter of claim 20, wherein the communications channel is an asymmetric digital subscriber line.

25. The transmitter of claim 20, wherein the transmitter transmits wirelessly, and wherein the data port is an antenna.

26. An electronic device comprising:

a data port for transmitting and receiving data;

a receiver coupled to the data port, the receiver containing circuitry to convert data received from the data port into digital data; and a transmitter coupled to the data port, the transmitter comprising a data unit coupled to a data source, the data unit containing circuitry to insert data and dummy signals into subchannels as a part of a transmission unit;

a compute unit coupled to the data unit, the compute unit to compute the dummy signals, wherein a least squares optimization is used to iteratively compute the dummy signals, and wherein a constraint is directly imposed on a power of the dummy signals during each iteration using a clipping function; and a digital-to-analog converter (DAC) coupled to the data unit, the DAC to convert the transmission unit into an analog transmission unit and to provide the analog transmission unit to the data port to be transmitted.

27. The electronic device of claim 26, wherein the data port is coupled to a communications channel, and wherein the communications channel is a digital subscriber line (DSL).

28. The electronic device of claim 27, wherein the communications channel is an asymmetric digital subscriber line (ADSL).

29. The electronic device of claim 26, wherein the data port is coupled to a communications channel, and wherein the communications channel is a wireless link.

* * * * *